May 19, 1953 — F. D. SAWYER — 2,638,726
DISK HARROW HITCH AND ANGLING MEANS
Filed Nov. 7, 1947 — 4 Sheets-Sheet 1
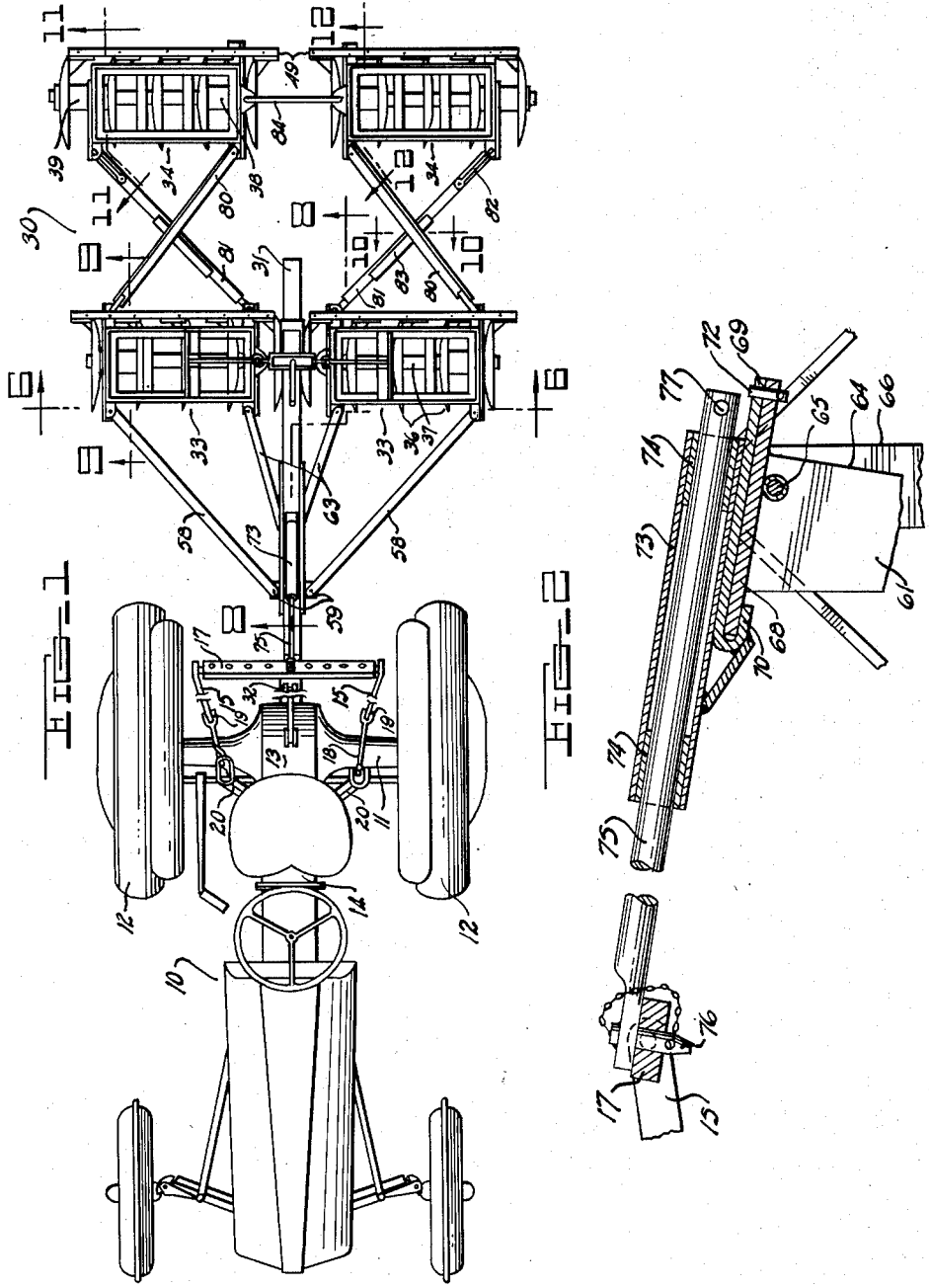
INVENTOR.
FREDRICK D. SAWYER
BY
ATTORNEY

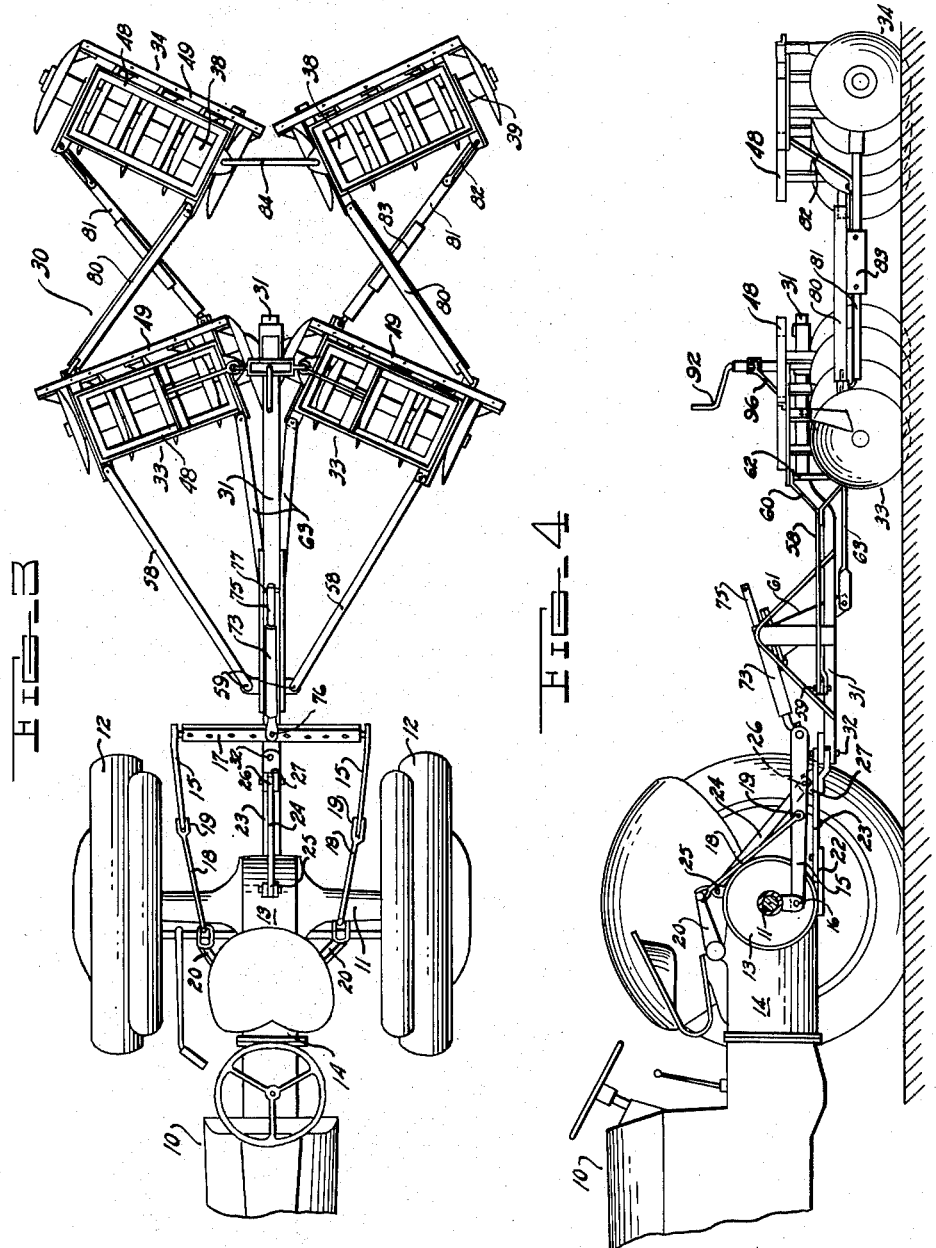

May 19, 1953
F. D. SAWYER
2,638,726
DISK HARROW HITCH AND ANGLING MEANS
Filed Nov. 7, 1947
4 Sheets-Sheet 3
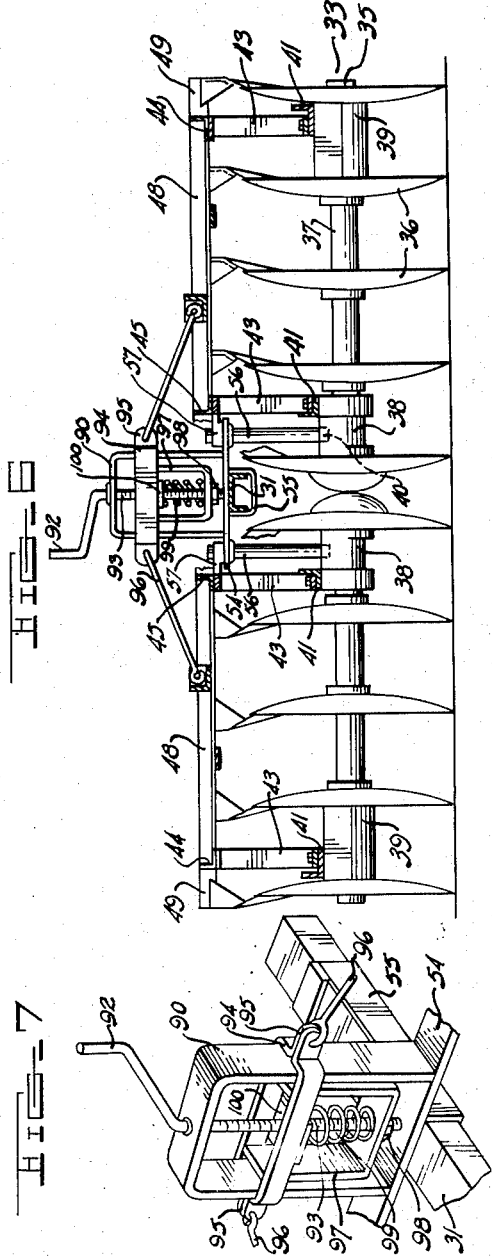
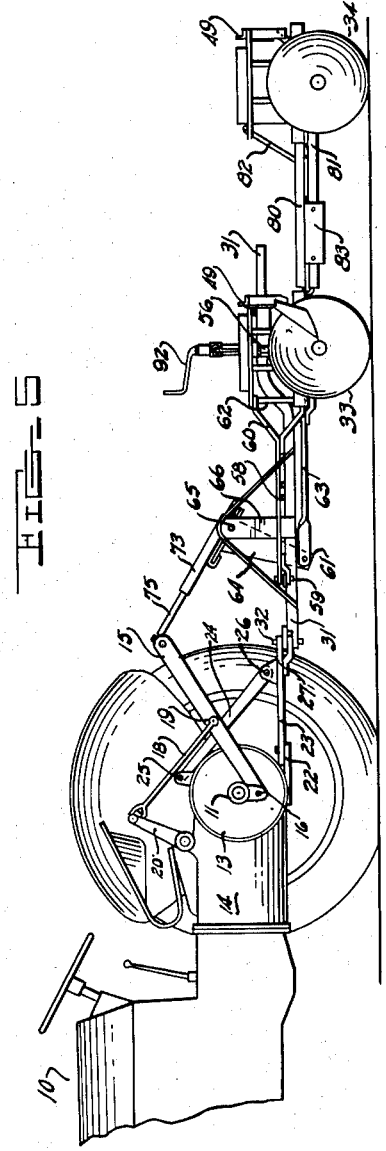
INVENTOR.
FREDRICK D. SAWYER
BY
ATTORNEY May 19, 1953  F. D. SAWYER  2,638,726
DISK HARROW HITCH AND ANGLING MEANS
Filed Nov. 7, 1947  4 Sheets-Sheet 4
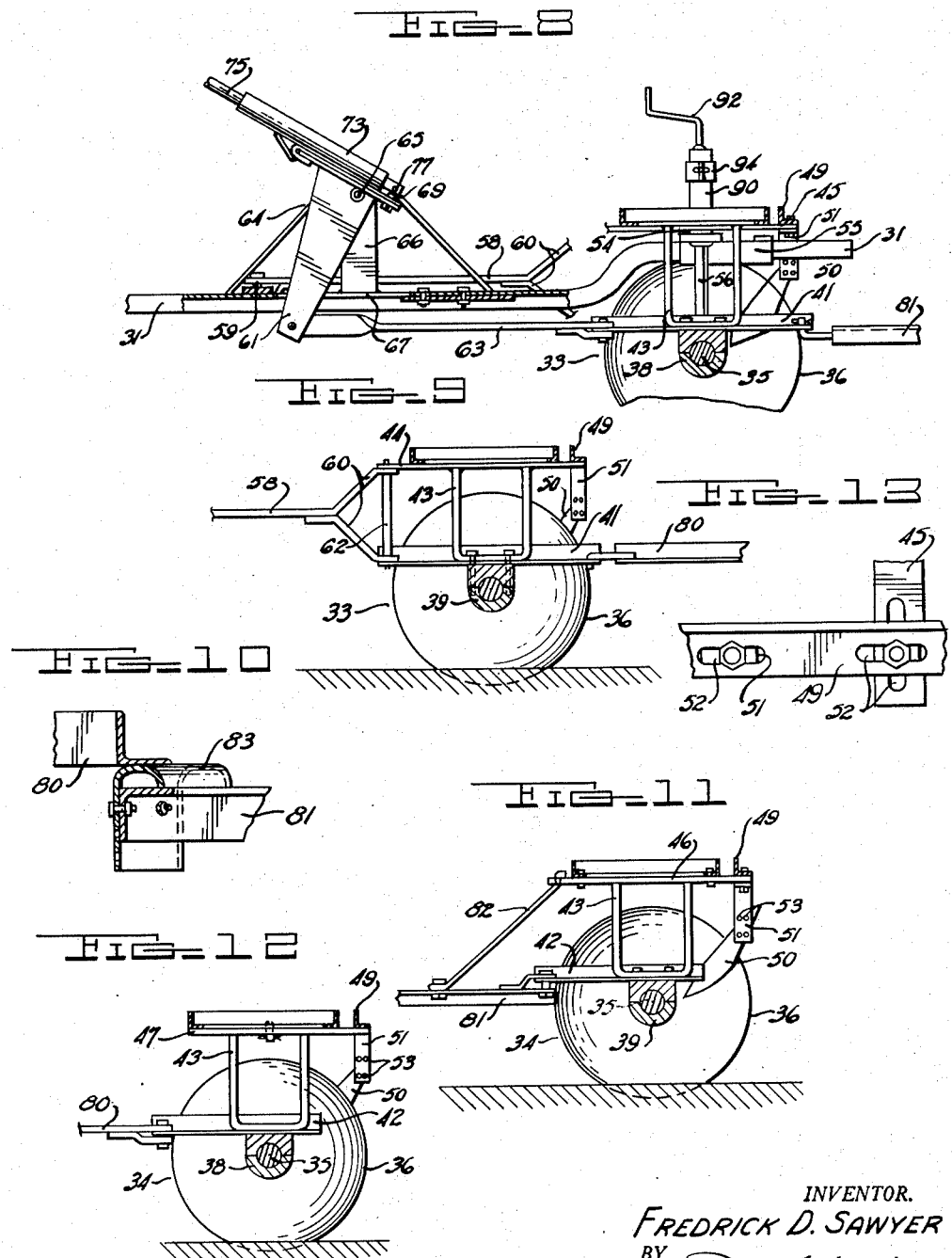
INVENTOR.
FREDRICK D. SAWYER
BY
ATTORNEY Patented May 19, 1953

2,638,726

UNITED STATES PATENT OFFICE 2,638,726

DISK HARROW HITCH AND ANGLING MEANS

Fredrick D. Sawyer, Wayne, Mich., assignor to Dearborn Motors Corporation, Detroit, Mich., a corporation of Delaware Application November 7, 1947, Serial No. 784,669

18 Claims. (Cl. 55—83)

This invention relates to agricultural implements; and, more particularly, to a disc harrow incorporating means for adjusting the angularity of the disc gangs automatically operable by the tractive device used to pull the harrow.

The disc harrow of this invention is particularly designed for use with and to complement the type of tractor which embodies a hydraulic lift attachment for the carriage or operation of the various implements employed. This hydraulic lift attachment is generally responsive to the draft forces imposed on the drawn implement to vary the position of the lift. Thus, the basic position of the lift mechanism may be manually selected for a certain draft force and thereafter the lift will raise if the draft tends to increase or will permit the implement to lower if the draft tends to decrease thereby maintaining the actual draft reaction imposed on the tractor substantially constant. However, notably in the "Ford" tractor, this constant draft control is associated with an alternatively operable implement height control. This employs substantially the same hydraulic system, linkage and control as the constant draft mechanism but modifies the latter so that the lift may be set at any chosen height by the operator; and it will not, thereafter, fall below the point so selected (although—as in the case of the constant draft control—the linkage is always free to rise since the hydraulic operating mechanism is single rather than double acting) no matter what variation may occur in the draft conditions. It is thus possible to set and maintain the hydraulically controlled draft linkage in any position within the range of operation of the linkage and to utilize this movement to effect adjustability or other operating characteristics of the drawn implement. Of course, the constant draft mechanism may be and has been used for this purpose but it suffers from the defect that it is often difficult to maintain any fixed intermediate position and it will generally operate satisfactorily only in the extreme raised or lowered positions—and not always in the former. A more detailed description of the hydraulic mechanism of the tractor does not seem to form a proper part of this disclosure since it is well known and recently widely distributed in the "Ford" tractor already referred to.

The purpose of the present invention is to devise an agricultural implement having a shiftable element operable to any selected position by operation of the tractor lift mechanism. While a disc harrow in which the shiftable element is the mechanism controlling the angularity of the discs is specifically disclosed, the same principal is adaptable to other implements. For example, it may be used to adjust the height of cut of a combine, the elevational alignment of the snapping mechanism of a corn picker, the incidence of the teeth of a spike harrow, or with other implements embodying a shiftable element susceptible of positional control.

Another purpose of this invention is to devise a disc harrow, single or tandem, in which the gangs may be adjusted and secured in any degree of angularity from zero cutting angle to a maximum cutting angle. Another purpose of this invention is to provide such adjustment by application of the power afforded by the tractor and operable whether the tractor is at rest or moving. Still another object is to permit angular adjustment of the gangs without the necessity of reversing the direction of the tractor as has been requisite in many previous devices.

Yet another object is to create a simple, strong, positive, and durable angularity control which is economical to manufacture and which will withstand the arduous service and liability to deterioration to which farm implements are subjected. In this respect, a further object has been to devise a hitch mechanism which is largely embodied in the implement itself so that it may be readily attached and removed from the basic tractor hitch and whose parts are so integrated that they will not be lost, mislaid or misconnected. Still further, the device shall not require any alteration in the structure or operation of the tractor so that the implement embodying it may be readily secured and detached without delay or effect on the operation of the tractor with other implements. Finally, in this respect, the connections so provided—although readily detachable and requiring only the simplest procedure so as to be effected without tools, the expenditure of substantial muscular effort or possibility of error—are certain in operation and afford a more than adequate margin of safety and mechanical strength.

The present structure—broadly as to the operation of a shiftable device on an agricultural implement and specifically as to the construction of a disc harrow—accomplishes each of these. It is readily susceptible of minor structural variation to adapt it to tractors other than that specifically shown which embody other lift or control means. The disc harrow, itself, embodies certain advantages in utility and durability, which will be touched upon in greater detail later, which are readily applicable to similar structures designed for operation apart from the automatic angularity control device for which it is primarily designed.

The linkage disclosed is applicable without substantial deviation to tractors embodying a draft controlled lift mechanism, a height controlled lift mechanism, or both; and is usable whether the operating medium is hydraulic, mechanical or relies upon other operating media. It is self-contained on the implement so that it is always available for use with the implement and is readily attached or detached. It requires no deviation from the normal operation of the tractor and no change from the basic structure requiring the use of tools or particular mechanical aptitude. It is positive in action and permanently adjustable to any point within an established range of variation. It will not be seriously affected by rust or deterioration and does not present any structure or movement which can be dangerous to the operator.

The specific disc harrow shown, while particularly designed for use with the linkage, embodies certain advantages which are of value in such implements generally. It is economical of manufacture, simple in operation, responds readily to variation in ground contour, may be adjusted to provide a transversely uniform cut, handles easily on turns, follows closely to provide uniform soil working, is easy to maintain and service—should the latter be necessary, and is inherently durable and strong. It can be readily assembled and disassembled for shipment and storage and it requires a minimum number of different parts thereby facilitating manufacture and repair.

With these and other objects in view, the invention comprises the devices described in the accompanying specification, claimed in the following claims and shown in the attached drawings, in which:

Figure 1 is a plan view of a tractor and associated disc harrow showing the latter in the transport or non-cutting position in which the disc gangs are axially normal to the direction of draft.

Figure 2 is a vertical section, on an enlarged scale through a portion of the shift mechanism.

Figure 3 is a plan view similar to Figure 1 except that the disc gangs are shown in cutting position, axially oblique to the line of draft.

Figure 4 is a longitudinal elevation corresponding to Figure 3.

Figure 5 is a longitudinal elevation corresponding to Figure 1.

Figure 6 is a transverse sectional elevation of the front disc gangs, on an enlarged scale, taken as indicated by the lines 6—6 on Figure 1.

Figure 7 is a perspective view, on an enlarged scale, showing the leveling device for the front gangs.

Figure 8 is a partial longitudinal elevation of the shifting device and the connections to the inner ends of the front gangs taken as indicated by the lines 8—8 on Figure 1.

Figure 9 is a partial longitudinal elevation showing the connections to the outer ends of the front discs and taken on the line 9—9 of Figure 1.

Figure 10 is a vertical section through the angling or X links taken on the line 10—10 of Figure 1.

Figure 11 is a sectional elevation showing the connections to the outer ends of the rear gangs taken on the line 11—11 of Figure 1.

Figure 12 is a sectional elevation showing the connections to the inner ends of the rear gangs taken on the line 12—12 of Figure 1.

Figure 13 is an enlarged fragmentary plan view showing the connection of the scraper mechanism.

Referring first to Figure 1, 10 indicates a tractor having a rear axle 11, rear wheels 12, differential housing 13 and a tubular body 14. Associated with this is a hitch structure comprising two spaced, trailing lower links 15 pivoted at their forward ends to the axle 11 at the points 16 (Figures 4 and 5) and detachably secured at their rear ends to a transverse drawbar 17. The links 15 may be swung upwardly by lift links 18 pivotally connected between the links 15 about midway of their length as at 19 and to the lift cranks 20 mounted on top of the body 14. The cranks 20 are operated by the control mechanism to swing counterclockwise by the application of hydraulic pressure and when this is released are free to move clockwise in response to the load on the links 15. The specific operating mechanism is not shown here since it is well known and is embodied in the "Ford" tractors now being manufactured. Thus far, the linkage described is that customarily used on tractors of this type. However, a drawbar connection 22 is provided on the bottom of the differential housing 13 and an auxiliary drawbar 23 is secured in it. The upper link 24 of the usual three-point hitch construction is normally pivoted at its inner end 25 to the upper part of the differential housing 13 where it is effective through a spring mechanism and a valving arrangement not shown here to operate the hydraulic system in response to draft reactions imposed on the tractor by the drawn implement. Here, however, its outer end 26 is not attached to the implement but to the rear end 27 of the auxiliary drawbar 23 merely providing a vertical strut for the latter and not functioning as a draft reaction transmitting member to effect operation of the hydraulic system. This construction provides a fixed rearwardly extending auxiliary drawbar terminating at about the path of the arcuate travel of the transverse drawbar 17.

Associated with the tractor is a tandem disc harrow 30 having a longitudinal drawbar 31 secured at its forward end by a vertical pivot pin 32 to the rear end of the auxiliary drawbar 23 and mounting two front gangs 33 to which are trailingly secured corresponding rear gangs 34. The individual gangs are substantially identical in construction (see Figures 6, 8, 9, 11 and 12), and although the method of attachment varies, each gang comprises an axle 35 on which are mounted a number of separate discs 36 axially spaced by spacers 37. Adjacent the inner and outer ends are bearing blocks 38 and 39 supporting the axle 35 through suitable bearing surfaces to which are attached lower longitudinal frame members (41 for the front gangs and 42 for the rear gangs) and the U-shaped stirrups 43. The latter, in turn, support the upper longitudinal frame members—44 for outer end front gang, 45 for inner end front gang, 46 for outer end rear gang and 47 for inner end rear gang—to which is secured a rectangular platform 48 on which additional weights may be placed. A transverse scraper blade bar 49 is secured behind each gang from the trailing ends of the respective upper frame members 44 and 45 or 46 and 47 and individual scraper blades 50 are secured at their upper ends to the bar 49 through supports 51 and bear, at their lower ends on the respective discs. Slots 52 are provided for the connections in both the frame members and bar 49 to allow adjustment of the scraper assembly relative to the frame (see Figure 13). Individual adjustments are provided by similar slots in the supports and bar and the angularity of the scraper blades can be adjusted by providing a plurality of bolt holes 53 in the supports 51 in which the connecting bolts may be selectively engaged.

The front gangs 33 are movably mounted at their inner ends on the drawbar 31 by a transverse frame 54 slidably supported on the bar by a box section 55 and engaging the vertical pivot posts 56 which have their lower ends seated in the recesses 40 in the bearing blocks 38 and their upper ends supported in bearing extensions 57 from the stirrups 43 (Figure 6). The outer ends of the front gangs are pivotally attached by the fore links 58 to fixed pivots 59 adjacent the front of the drawbar 31. The links 58 have a Y 60 at their rear ends (Figure 9) which engages a pivot post 62 mounted in forward extensions of the outer frame members 41 and 44.

The angling of the front gangs is effected by angling links 63 attached between forward extensions of the inner frame members 41 and the lower leg 61 of a rockable crank 64. The crank 64 is pivoted at 65 between standards 66 attached to the drawbar 31 and its lower end extends through a slot 67 in the top of the drawbar. The other leg of the crank comprises a plate 68 having an upper plane surface normal to the leg 61. A pivoting plate 69 has a turned over front lip 70 loosely embracing the front edge of the plate 68 and a pin 72 extends through both plates 68 and 69 permitting relative pivotal movement thereabout. A tube 73 is welded to the pivoting plate 69 and slidably receives in bushings 74 (preferably of the "Oilite" type) the shift rod 75. The forward end of the rod 75 is flattened and may be removably secured to the transverse drawbar 17 by the pin 76. A stop 77 prevents the rod 75 from being completely withdrawn from the tube 73.

The operation of the shift device is believed to be made clear by the foregoing description and a comparison of Figures 1, 2, 3, 4, and 5. Starting with Figures 1, 2 and 5 when the tractor hydraulic lift is in raised position, the shift rod 75 is raised accordingly and drawn slightly forwardly and its associated tube 73 is aligned about 30° above the horizontal. The lower leg 61 of the crank 64 extends forwardly drawing with it the links 63 which hold the inner ends of the front gangs in such a position that the gang is in inoperative position.

Now, if the hydraulic lift mechanism is released and the links 15 are allowed to fall to the position shown in Figures 3 and 4, the shift rod 75 swings counter clockwise and moves slightly rearwardly while the associated tube 73 is aligned about 15° below the horizontal. This moves the lower leg 61 of the crank 64 rearwardly and pushes back on the links 63 which slide the transverse frame 54 rearwardly on the drawbar 31 carrying the inner ends of the front gangs 33 to the position shown in Figure 3. The outer ends of the front gangs are restrained to movement in an arcuate path by the links 58 and the result is the gang alignment shown. Obviously, any intermediate angularity is obtainable depending upon the position in which the transverse drawbar 17 is held. Further, because of the mode of attachment and the alignment of the attaching means, full provision is made for freedom in turning the implement and for operation despite irregularities in the ground without substantial change being imparted to the established disc cutting angle.

Corresponding angling of the rear gangs is effected by upper and lower X-links 80 and 81 as best shown in Figures 1 and 3. The upper X links 80 are universally attached at their forward ends to the trailing ends of the lower outer frame members 41 (Figure 9) and at their rearward ends pivotally attached to the forward ends of the lower inner frame members 42 (Figure 12). The lower X links 81 are similarly attached at their forward ends to the trailing ends of the inner, lower frame members 41 (Figure 8) and at their rearward ends to the forward ends of the outer, lower frame members 42 while a brace 82 extends upwardly and rearwardly from the link 81 to the forward end of the frame member 46 to assist in preserving vertical alignment of the rear gangs (Figure 11). The lower X links 81 are equipped with a curved buffer plate 83 (see Figures 1 and 10) which permits the corresponding upper link to slide freely over it, especially when the implement is operated in rough ground.

Comparison of Figures 1 and 3 will clearly indicate the reverse angling operation imposed on the rear gangs by the X links attached to the front gangs. Thus, when—as in Figure 1—the front gangs are normal to the line of draft and in transport or inoperative position, the rear gangs are similarly disposed. However, when the front gangs are angled by the angling mechanism described above, the X links impart an equal and opposite angularity to the rear gangs and maintain them in this condition during the operation of the implement.

One further point requires description: the interconnection between the front gangs and between the rear gangs. The latter is merely a pig tail 84 universally attached at each end to the inner ends of the platform on each rear gang. The former presents a somewhat more difficult problem since it is necessary to prevent the outer ends of the front gangs from digging in too deeply. An equalizer shown in detail in Figures 6 and 7 provides the necessary control. This comprises an inverted U stirrup 90 secured to the transverse frame 54 which rotatably supports a crank 92 having a threaded shank 93 with its lower end seated in a depression in the frame 54. A box member 94 is slidably mounted on the exterior of the stirrup 91 and has an ear 95 on either side from which a link 96 extends to the platform 48 of the corresponding gang. An upright U-shaped member 97 is mounted on the shank 93 and has a nut 98 welded to it which threadedly engages the shank. A spring 99 is interposed between the base of the member 97 and a cross plate 100 secured to the box member 94. It is apparent that as the crank 92 is operated the member 97 is raised compressing the spring 99 and resiliently urging the box member 94 upwardly. This, in turn, tends to lift the outer end of each front gang slightly to maintain the desired vertical axial alignment.

While a specific form of angling mechanism is shown and applied to but one type of implement— a disc harrow; it will be apparent that the same angling mechanism can be applied to other implements including a positionally adjustable element. Similarly, the specific type of harrow shown may be used with conventional tractor hitches. It is therefore the intention to cover by the claims the novel and inventive features properly included within the scope of this invention and not limited to the specific embodiments shown.

The invention claimed is:

1. In a disc harrow, a longitudinal drawbar, a support frame slidably mounted adjacent the rear end of said drawbar, a disc gang extending substantially transversely of said drawbar and having a pivoted connection adjacent its inner end to said slidable frame, a link extending from adjacent the outer end of said disc gang to the forward part of said drawbar, means to vary the angularity of said disc gang by sliding said support frame longitudinally of said drawbar comprising a bell crank mounted on said drawbar forwardly of said frame, a connection between one end of said bell crank and said frame, a tube associated with the other end of said bell crank and a rod slidably received in said tube.

2. In a disc harrow, a longitudinal drawbar, a support frame slidably mounted adjacent the rear end of said drawbar, a disc gang extending substantially transversely of said drawbar and having a pivoted connection adjacent its inner end to said slidable frame, a link extending from adjacent the outer end of said disc gang to the forward part of said drawbar, a standard on said drawbar supporting a transverse pivot, a bell crank rockably mounted on said pivot and having one leg substantially horizontal and the other leg substantially vertical, a connection between the lower end of said vertical leg and said slidable frame effective to move said frame on said drawbar as said bell crank is rocked to vary the angularity of said disc gang, a tube associated with the horizontal leg of said bell crank normally in substantial axial alignment with said drawbar and means to rock said bell crank comprising a rod slidably received in said tube and extending forwardly therefrom.

3. In a disc harrow, a longitudinal drawbar, a support frame slidably mounted adjacent the rear end of said drawbar, disc gangs extending substantially transversely of said drawbar on each side thereof, said gangs having a vertical pivot connection with said frame adjacent their inner ends, links extending from adjacent the outer end of each said disc gang to the forward part of said drawbar, means carried by said support frame to adjust the relative vertical axial angularity of said gangs, a standard on said drawbar supporting a transverse pivot, a bell crank rockably mounted on said pivot and having one leg substantially horizontal and the other leg substantially vertical, a connection between the lower end of said vertical leg and said slidable frame effective to move said frame on said drawbar as said bell crank is rocked to vary the angularity of said disc gangs, a tube associated with the horizontal leg of said bell crank normally in substantial axial alignment with said drawbar and means to rock said bell crank comprising a rod slidably received in said tube and extending forwardly therefrom.

4. The structure of claim 3 which is further characterized in that said means to adjust the relative vertical axial angularity of said gangs comprises an upright support on said support frame, a member vertically slidable on said upright support, links between said member and said gangs outwardly of said vertical pivot connections, and adjustable means resiliently urging said member upwardly on said support to lift the outer ends of said disc gangs.

5. In a tandem disc harrow, a longitudinal drawbar, a support frame slidably mounted adjacent the rear end of said drawbar, disc gangs extending substantially transversely of said drawbar on each side thereof, said gangs having a vertical pivot connection with said frame adjacent their inner ends, links extending from adjacent the outer end of each said disc gang to the forward part of said drawbar, means carried by said support frame to adjust the relative vertical axial angularity of said gangs, a standard on said drawbar supporting a transverse pivot, a bell crank rockably mounted on said pivot and having one leg substantially horizontal and the other leg substantially vertical, a connection between the lower end of said vertical leg and said slidable frame effective to move said frame on said drawbar as said bell crank is rocked to vary the angularity of said disc gangs, a tube associated with the horizontal leg of said bell crank normally in substantial axial alignment with said drawbar and means to rock said bell crank comprising a rod slidably received in said tube and extending forwardly therefrom, a second pair of gangs behind said first pair of gangs and each connected to the respective forward gang by two crossed links pivotally connected at their ends to opposite ends of said gangs, said crossed links being in contact at their point of crossing.

6. A disc harrow construction comprising a longitudinal drawbar, a pair of forward disc gangs positioned at either side of said drawbar, a transverse frame pivotally interconnecting the inner portions of said forward disc gangs and slidably engaging said drawbar, a link connecting the outer portion of each of said forward disc gangs to said drawbar, a pair of rear disc gangs positioned behind said front disc gangs, means for controlling the vertical axial angularity of said front disc gangs, means for moving said transverse frame longitudinally of said drawbar to adjust the horizontal axial angularity of said front disc gangs, and mean for controlling the vertical and horizontal axial angularity of said rear disc gangs comprising a pair of X links attaching the ends of each of said front gangs to opposite ends of the respective rear gang, said X links being in contact at their point of crossing, the lower link of each pair of X links interconnecting the end of a front and rear gang normally subject to upward movement due to soil reaction.

7. A construction defined in claim 6 in which said means for controlling the vertical axial angularity of said front disc gangs comprises an upright support on said transverse frame, a member vertically slidable on said upright support, a link between said member and each of said pair of forward disc gangs, and adjustable means resiliently urging said member upwardly on said support to lift the outer end of each of said disc gangs.

8. The construction as defined in claim 6 in which said means for moving said transverse frame longitudinally of said drawbar comprises a support carried by said drawbar, a bell crank pivotally attached to said support, adjusting links connecting the lower leg of said bell crank to the inner end of each of said forward disc gangs, said bell crank having an extensible upper leg pivotally secured to the lower leg thereof on an axis at right angles to the pivotal axis of said bell crank.

9. For use with a tractor having a fixed drawbar connection, a link pivotally carried by said tractor and extending rearwardly thereof and means for controlling the vertical position of the extending end of said link; an implement having a longitudinal drawbar adapted to be attached to said tractor drawbar connection, a support frame slidably carried by said drawbar, and means for adjusting the longitudinal position of said support frame on said drawbar comprising a crank pivotally carried by said drawbar and adapted to be connected at its forward end to the said extending end of said tractor link for vertical movement therewith, and link means connecting the other end of said crank to said support frame.

10. An implement as set forth in claim 9 wherein the forward end of said crank comprises an extensible member pivotally secured to said crank on an axis at right angles to the pivotal axis thereof.

11. For use with a tractor having a fixed drawbar connection, a link pivotally carried by said tractor and extending rearwardly thereof and means for controlling the vertical position of the extending end of said link; an implement having a longitudinal drawbar adapted to be attached to said tractor drawbar connection, a support frame slidably carried by said drawbar, a disc gang positioned at either side of said drawbar and having its inner portion pivotally secured to said support frame, link means connecting the outer portion of each of said disc gangs to a fixed point on said drawbar, and means for adjusting the longitudinal position of said support frame on said drawbar comprising a crank pivotally carried by said drawbar and adapted to be connected at its forward end to the said extending end of said tractor link for vertical movement therewith, and link means connecting the other end of said crank to said support frame.

12. An implement as set forth in claim 11 further characterized by means carried by said support frame for controlling the vertical axial angularity of said disc gangs.

13. An implement as set forth in claim 11 further including means carried by said support frame for controlling the vertical axial angularity of said disc gangs, said means comprising an upright support on said frame, a member vertically slidable on said upright support, a link between said member and each of said disc gangs, and adjustable means resiliently urging said member upwardly on said support to lift the outer end of each of said disc gangs.

14. For use with a tractor having a fixed drawbar connection, a link pivotally carried by said tractor and extending rearwardly thereof and means for controlling the vertical position of the extending end of said link; an implement having a longitudinal drawbar adapted to be attached to said tractor drawbar connection, a support frame slidably carried by said drawbar, a pair of front disc gangs each having its inner portion pivotally secured to said support frame, link means connecting the outer portion of each of said front disc gangs to said drawbar, a pair of rear disc gangs positioned behind said front disc gang, the discs of said rear gangs being mounted for reverse soil-working action from the discs of said front gangs, means for adjusting the longitudinal position of said support frame on said drawbar to adjust the horizontal axial angularity of said front disc gangs, comprising a crank pivotally carried by said drawbar and adapted to be operatively connected at its forward end to the said extending end of said tractor link for vertical movement therewith, link means connecting the other end of said crank to said support frame, means for adjusting the horizontal axial angularity of said rear disc gang comprising a pair of X links attaching the ends of each of said front gangs to opposite ends of the respective rear gang, said X links being in contact at their point of crossing.

15. An implement as set forth in claim 14 further including means to control the vertical axial angularity of said front disc gangs, and wherein the lower link of each pair of X links is connected between the end of a front and rear gang normally subject to upward movement due to soil reaction.

16. In a tandem disc implement, a longitudinal drawbar, a support frame mounted for longitudinal sliding movement along said drawbar adjacent the rear end thereof, front disc gangs extending substantially transversely of said drawbar, said front disc gangs having a vertical pivot connection with said frame adjacent their inner ends, links extending from adjacent the outer end of each said front disc gangs and pivoted to the forward part of said drawbar, second links extending from adjacent the inner end of each said front disc gangs, a bell crank pivotally mounted on said drawbar and having a lower leg extending downwardly through a longitudinal slot in said drawbar, the forward ends of said second links being pivoted to the end of said lower leg beneath said drawbar, an upper leg on said bell crank substantially normal to said lower leg, a tube mounted for limited pivotal movement on said upper leg relative to the longitudinal axis of said drawbar, and a bar slidably received in said tube, said bar carrying attaching means at the forward end thereof.

17. A tandem disc implement as set forth in claim 16 further including a pair of rear gangs independent of said drawbar positioned behind said front gang, the discs of said rear gangs being mounted for reverse soil working action from the discs of said front gang, a pair of X links attaching the ends of each of said front gangs to opposite ends of each respective rear gang, said X links being in contact at their point of crossing, and means securing the inner ends of said rear gangs in spaced relationship.

18. A tandem disc implement as set forth in claim 17 further characterized by adjustable means being provided between the inner ends of said front gangs to vary the vertical axial alignment of said front gang and wherein the lower link of each pair of X links is connected between the end of a front and rear gang normally subject to upward movement due to soil reaction, whereby the vertical axial alignment of said front gangs is transmitted to said rear gangs through said pairs of X links.

FREDRICK D. SAWYER.

References Cited in the file of this patent
UNITED STATES PATENTS

| Number | Name | Date |
|---|---|---|
| 1,669,080 | Dewend | May 8, 1928 |
| 1,913,036 | Mowry | June 6, 1933 |
| 1,967,493 | Boda | July 24, 1934 |
| 2,228,508 | Crumb et al. | Jan. 14, 1941 |
| 2,283,377 | Lindgren et al. | May 19, 1942 |
| 2,285,550 | Woods | June 9, 1942 |
| 2,353,790 | Seaholm | July 18, 1944 |
| 2,413,807 | Warne | Jan. 7, 1947 |
| 2,469,605 | McKay | May 10, 1949 |